US005732202A

United States Patent [19]
Okamoto

[11] Patent Number: 5,732,202
[45] Date of Patent: Mar. 24, 1998

[54] DATA PROCESSING APPARATUS, DATA PROCESSING METHOD, MEMORY MEDIUM STORING DATA PROCESSING PROGRAM, OUTPUT DEVICE, OUTPUT CONTROL METHOD AND MEMORY MEDIUM STORING CONTROL PROGRAM THEREFOR

[75] Inventor: Yoshifumi Okamoto, Yokohama, Japan

[73] Assignee: Canon Kabushiki Kaisha, Tokyo, Japan

[21] Appl. No.: 599,846

[22] Filed: Feb. 12, 1996

[30] Foreign Application Priority Data

| Feb. 13, 1995 | [JP] | Japan | 7-024204 |
| May 24, 1995 | [JP] | Japan | 7-124979 |
| Jan. 26, 1996 | [JP] | Japan | 8-011699 |
| Feb. 8, 1996 | [JP] | Japan | 8-022482 |

[51] Int. Cl.⁶ .................................................. G06K 15/00
[52] U.S. Cl. ........................................ 385/117; 395/115
[58] Field of Search ........................... 382/235, 296, 382/297, 298–299, 300, 305; 395/101, 102, 105, 112, 114, 115, 116, 117, 137, 507, 508, 509, 876, 877; 358/443, 444; 345/202, 201, 126

[56] References Cited

U.S. PATENT DOCUMENTS

| 4,271,476 | 6/1981 | Lotspiech | 395/235 |
| 4,300,206 | 11/1981 | Belleson et al. | 395/117 |
| 5,570,464 | 10/1996 | Fuse | 395/105 |

*Primary Examiner*—Arthur G. Evans
*Attorney, Agent, or Firm*—Fitzpatrick, Cella, Harper & Scinto

[57] ABSTRACT

There is disclosed a data processing apparatus capable of rotating image data in the block unit, for achieving faster process with reduced memory capacity. The data processing apparatus comprises recognition means for recognizing the size of data of a bit map format to be compressed and the size rotatable by rotation means, division means for dividing the bit map-formatted data to be compressed, based on the size of the bit map-formatted data and the size rotatable by the rotation means recognized by the recognition means, compression means for compressing the bit map-formatted data divided by the division means, and transfer means for transferring the bit map-formatted data, compressed by the compression means, to an output device.

46 Claims, 15 Drawing Sheets

ROW 1

ROW 2

DATA PROCESSING APPARATUS, DATA PROCESSING METHOD, MEMORY MEDIUM STORING DATA PROCESSING PROGRAM, OUTPUT DEVICE, OUTPUT CONTROL METHOD AND MEMORY MEDIUM STORING CONTROL PROGRAM THEREFOR

BACKGROUND OF THE INVENTION

1. Field of the Invention

The present invention relates to a data processing apparatus and a data processing method for effecting compression of bit map data or the like and a memory medium storing a data processing program therefor. Also the present invention relates to an output device and an output control method for effecting decompression, rotation etc. of bit map data and a memory medium storing a control program therefor.

2. Related Background Art

In the conventional conversion of characters represented in the outline format into a bit map font represented by a bit map format, the compression is executed for each character for economizing the memory capacity. At the printout of such data, the compressed font data are decompressed on a bit map memory, with rotation of the bit map font in the unit of 90° in a rotator if such rotation is required at the printout.

In such conventional process, however, for the rotation of the bit map font in the unit of 90°, the compressed bit map data are decompressed and stored in a memory, and, if such decompressed bit map data are larger than an M×N matrix in the rotator, the decompressed bit map data are processed in divided manner with a size smaller than the M×N matrix. Consequently such conventional process is associated with drawbacks of repeated accesses to the memory and a long process time required for such divided processing.

SUMMARY OF THE INVENTION

In consideration of the foregoing, an object of the present invention is to provide a data processing apparatus and a method therefor, capable of effecting compression based on the size of the rotator, in order to achieve high-speed decompression and rotation.

Another object of the present invention is to provide a data processing apparatus and a method therefor, capable of high-speed transfer of the bit map data from an upper apparatus to a peripheral device in a state enabling high-speed processing of the bit map data in the peripheral device.

The above-mentioned objects can be attained, according to the present invention, by a data processing apparatus comprising recognition means for recognizing the size of the data to be processed in a bit map format and the size rotatable by rotation means; division means for dividing the bit map formatted data to be compressed, based on the size of the bit map formatted data and the size rotatable by the rotation means, recognized by the recognition means; compression means for compressing the bit map formatted data divided by the division means; and transfer means for transferring the bit map formatted data, compressed by the compression means, to an output device.

Also according to the present invention, there is provided an output device comprising memory means for storing the compressed bit map formatted data; discrimination means for discriminating whether the compressed bit map formatted data are stored in divided form; decompression means for decompressing the divided and compressed bit map formatted data if the discrimination means identifies a divided memory state; rotation means for rotating the bit map formatted data decompressed by the decompression means; and output means for output of the bit map formatted data rotated by the rotation means.

Also according to the present invention, there is provided a data processing method comprising a recognition step for recognizing the size of bit map formatted data to be compressed and the size rotatable by a rotator; a division step for dividing the bit map formatted data to be compressed, based on the size of the bit map formatted data and the size rotatable by the rotator, recognized by the recognition step; a compression step for compressing the bit map formatted data divided by the division step; and a transfer step for transferring the bit map formatted data, compressed by the compression step, to an output device.

Also according to the present invention, there is provided an output control method comprising a memory step for storing compressed data in a bit map format in memory means; a discrimination step for discriminating whether the compressed bit map formatted data are stored in divided manner; a decompression step for decompressing the divided and compressed bit map formatted data if the discrimination step identifies a divided memory state; a rotation step for rotating the bit map formatted data, decompressed by the decompression step, by a rotator; and an output step for output of the bit map formatted data, rotated by the rotation step, by output means.

Also according to the present invention, there is provided a memory medium featured by storing a data processing program comprising a recognition step for recognizing the size of data in a bit map format to be compressed and the size rotatable by a rotator; a division step for dividing the bit map formatted data to be compressed, based on the size of the bit map formatted data and the size rotatable by the rotator, recognized by the recognition step; and a compression step for compressing the bit map formatted data divided by the division step.

Also according to the present invention, there is provided a memory medium featured by storing a data processing program comprising a memory step for storing compressed data in a bit map format in memory means; a discrimination step for discriminating whether the compressed bit map formatted data are stored in divided manner; a decompression step for decompressing the divided and compressed bit map formatted data if the discrimination step identifies a divided memory state; and a rotation step for rotating the bit map formatted data decompressed by the decompression step.

Furthermore, the foregoing objects can be attained, according to the present invention, by a data processing apparatus comprising recognition means for recognizing the size of data in a bit map format to be compressed and the size rotatable by a rotator; compression means for compressing the bit map formatted data based on the size of the bit map formatted data and the size rotatable by the rotation means, recognized by the recognition means; and transfer means for transferring the bit map formatted data, compressed by the compression means, to an output device.

Also according to the present invention, there is provided an output device comprising memory means for storing compressed data in a bit map format; discrimination means for discriminating whether the compressed bit map formatted data are stored; rotation means adapted, if the discrimination means identifies a stored state, for decompressing the compressed bit map formatted data and rotating thus decompressed bit map formatted data; and output means for output of the bit map formatted data rotated by the rotation means.

Also according to the present invention there is provided a data processing method comprising a recognition step for recognizing the size of data to be compressed in a bit map format and the size rotatable by a rotator; a compression step for compressing the bit map formatted data, based on the size of the bit map formatted data and the size rotatable by the rotator, recognized by the recognition step; and a transfer step for transferring the bit map formatted data, compressed by the compression step, to an output device.

Also according to the present invention, there is provided an output control method comprising a memory step for storing compressed data of a bit map format in memory means; a discrimination step for discriminating whether the compressed bit map formatted data are stored; a rotation step adapted, if the discrimination step identifies a stored state, for decompressing the compressed bit map formatted data and rotating thus decompressed bit map formatted data by the rotator; and an output step for output of the bit map formatted data, rotated by the rotation step, to output means.

Also according to the present invention, there is provided a memory medium storing a data processing program comprising a recognition step for recognizing the size of data to be compressed in a bit map format; a recognition step for recognizing the size rotatable by a rotator; and a compression step for compressing the bit map formatted data, based on the size of the bit map formatted data and the size rotatable by the rotator recognized by the above-mentioned recognition steps.

Also according to the present invention, there is provided a memory medium storing a data processing program comprising a memory step for storing compressed data of a bit map format in memory means; a discrimination step for discriminating whether the compressed bit map formatted data are stored; a rotation step adapted, if the discrimination step identifies a stored state, for decompressing the compressed bit map formatted data and rotating thus decompressed bit map formatted data by the rotator; and an output step for output of the bit map formatted data, rotated by the rotation step, to output means.

Also in the conventional process explained in the foregoing, the transporting direction of a sheet loaded on the printer may be different from the direction of the image data developed by the host CPU. For example, while the host CPU is capable of preparing the image data in a vertically oblong A4 format, the printer may only be capable of transporting the A4-sized sheet in the horizontally oblong position. In such case, the vertical-horizontal conversion has to be made in the printer after the decompression of the compressed data received by the printer, so that a long process time is required. Besides, in order to reduce the memory capacity in the printer, the image data after the vertical-horizontal conversion have to be compressed again in the printer, so that the printer has to be provided with the data compressing function.

In consideration of the foregoing, another object of the present invention is to provide an output device, a control method therefor and a memory medium storing an output control program, capable of reducing the time required for output process and also economizing the required memory.

The foregoing object can be attained, according to the present invention, by an output device for releasing image data divided into blocks of a predetermined size, comprising:

rotation means for rotating each of the blocks in said image data;

block rearrangement means for rearranging the blocks contained in said image data, utilizing the blocks as components of the image, thereby rotating said image data in a direction same as that of rotation by said rotation means; and output means for releasing the image data rotated by said rotation means and said rearrangement means.

Also according to the present invention, there is provided an output device comprising:

block formation means for dividing image data into blocks of a predetermined size;

rotation means for rotating each of the blocks in said image data;

block rearrangement means for rearranging the blocks contained in said image data, utilizing the blocks as components of the image, thereby rotating said image data in a direction same as that of rotation by said rotation means; and output means for releasing the image data rotated by said rotation means and said rearrangement means.

Also according to the present invention, there is provided an output control method for releasing image data divided into blocks of a predetermined size, comprising:

a rotation step of rotating each of the blocks contained in said image data;

a block rearrangement step of rearranging the blocks contained in said image data, utilizing the blocks as components of the image, thereby rotating said image data in a direction same as that of rotation by said rotation step; and an output step for releasing the image data rotated by said rotation step and said rearrangement step.

Also according to the present invention, there is provided a memory medium storing an output control program comprising:

a rotation step of rotating blocks contained in image data; and a rearrangement step of rearranging the blocks contained in said image data, utilizing the blocks as components of an image, thereby rotating said image data in a direction same as that of rotation by the rotation step.

DESCRIPTION OF THE PREFERRED EMBODIMENTS

[1st embodiment]

Figure 1:
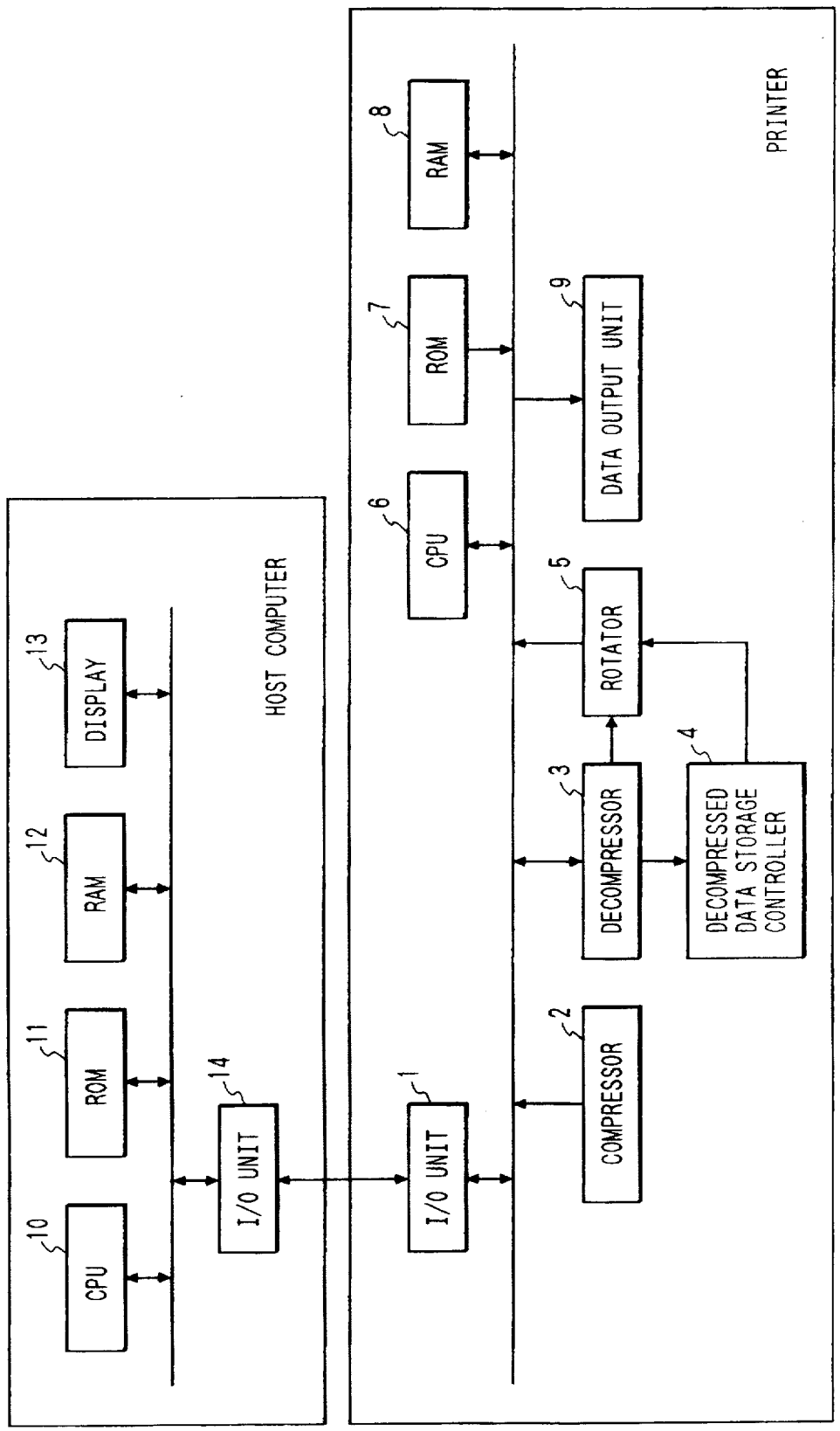
FIG. 1 is a block diagram of a first embodiment of the present invention.

In FIG. 1, there are shown an I/O unit for data exchange with an upper apparatus such as a host computer 10; a compressor 2 for converting characters etc., represented in the outline format, into bit map data, represented in a bit map format, and compressing thus converted bit map data; a decompressor 3 for decompressing the bit map data compressed by the compressor 2; and a rotator 5 for rotating 128×128 matrix data in the unit of 90°. The data decompressed by the decompressor 3 are consecutively written, by a decompressed data storage controller 4, into the rotator 5 composed of a hardware. There are also shown a CPU 6 for controlling the entire printer apparatus; a ROM 7 storing control programs corresponding to the flow charts shown in FIGS. 4 and 5, and outline font data; a RAM 8 including, for example, a buffer memory for storing print commands and print data from the upper apparatus, a work memory for the CPU 4, a page memory for storing bit map data developed for printing, and a cache memory for storing bit map data generated from the outline data; and a data output unit 9 composed of a printer engine for example of a laser beam printer, for visible output of the bit map data stored in the RAM 8. The programs corresponding for example to the flow charts in FIGS. 4 and 5 may be stored in an IC card mounted on the printer or downloaded into the RAM 8 from the host computer, instead of being stored in the ROM 7.

Figure 7:
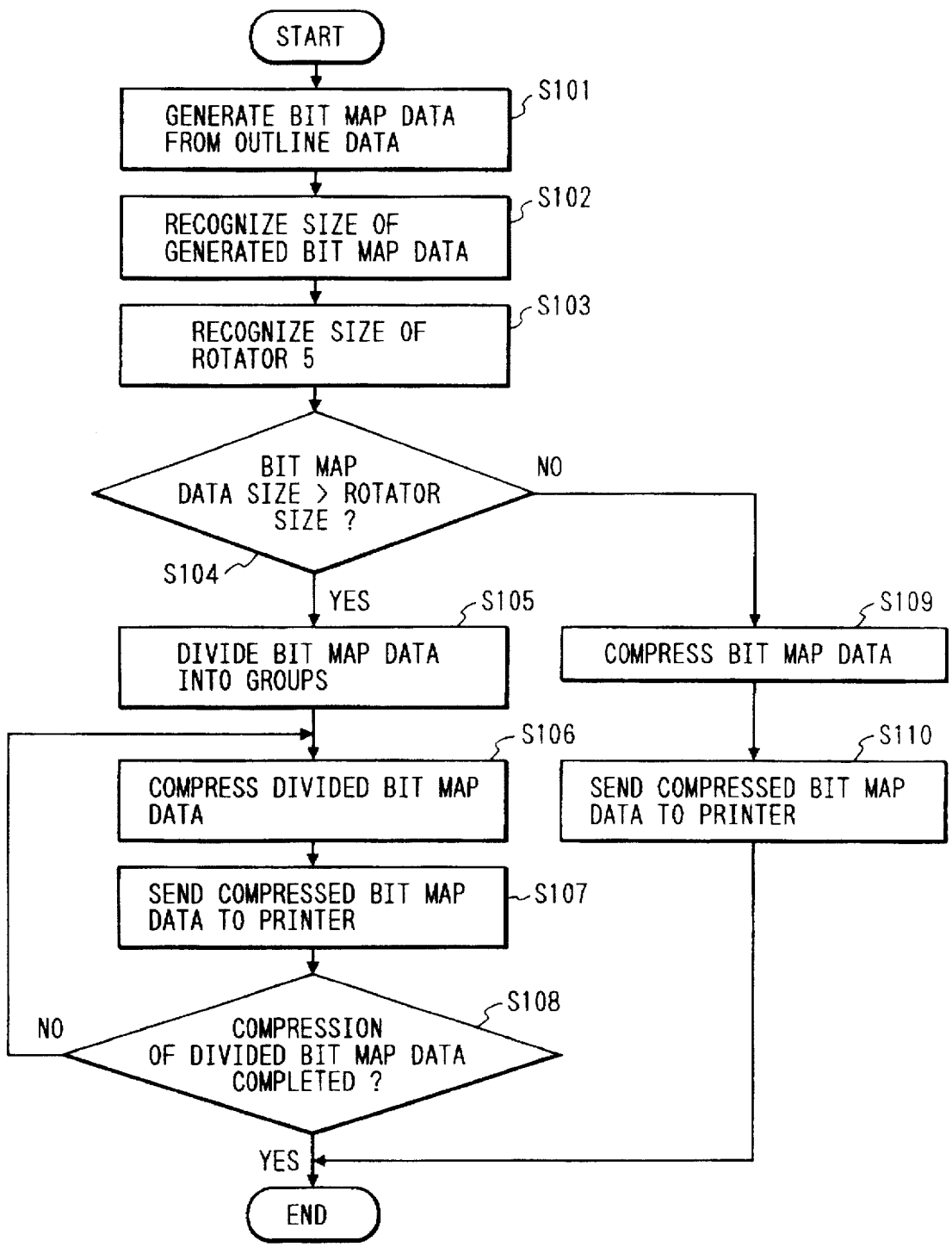
FIG. 7 is a flow chart of a division and compression process executed in an upper apparatus.

There are further shown a CPU 10 for controlling the entire upper apparatus; a ROM 11 for storing a control program corresponding to a flow chart in FIG. 7 and outline font data; a RAM 12 constituting a work memory for the CPU 10; a display unit 13, composed for example of a CRT, for displaying various data; and an I/O unit 14 for data exchange with the printer.

Print commands and print data are transferred from the upper apparatus 10 and through the I/O unit 1, and are stored in the buffer memory in the RAM 8. The CPU 6 analyzes the print commands and the print data stored as explained above and generates bit map font data from the outline font data stored in the ROM 7. For the purpose of economizing the memory capacity, the compressor 2 compresses the bit map font data, with division of the bit map font data into blocks of a size of 128×128 bits or smaller, in consideration of the 128×128 matrix size of the rotator 5. In an example shown in FIG. 2, the compression is executed in the sequential order of (1), (2), (3) and (4), and the compressed data are stored in the cache memory in the RAM 8, as will be explained later in more details, in relation to FIG. 4. After completion of all the analyses and of the preparation of the data output unit 9, bit image data of a page are prepared in the page memory of the RAM 8, based on the data cached in the cache memory, and the bit image data thus prepared are transferred to the data output unit 9.

The decompression of the compressed data and the storage in the cache memory of the RAM 8 will be explained in more details with reference so FIGS. 2 and 3.

Figure 2:
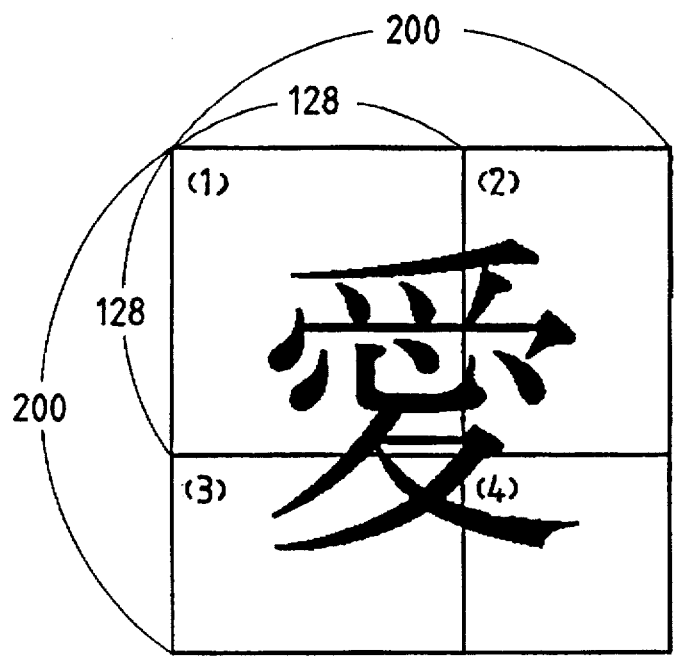
FIG. 2 is a view showing division of bit map data.
Figure 3:
FIG. 3 is a view showing 90° rotation of bit map data.

The compressed data of the block (1) in FIG. 2 are written into the decompressor 3. The decompressor 3 decompresses the compressed data to generate decompressed data, which are stored in succession in the rotator 5 by the decompressed data storage controller 4. At the end of the decompression, the decompressed data are stored in the rotator 5, so that the CPU 6 can obtain the data rotated in the unit of 90°, by reading the data from the rotator 5 (data being shown in a block (3) in FIG. 3). Similar control is conducted also for the blocks (2), (3) and (4), to provide 90° rotated data shown in FIG. 3, as will be explained later in more details in relation to FIG. 5.

Figure 4:
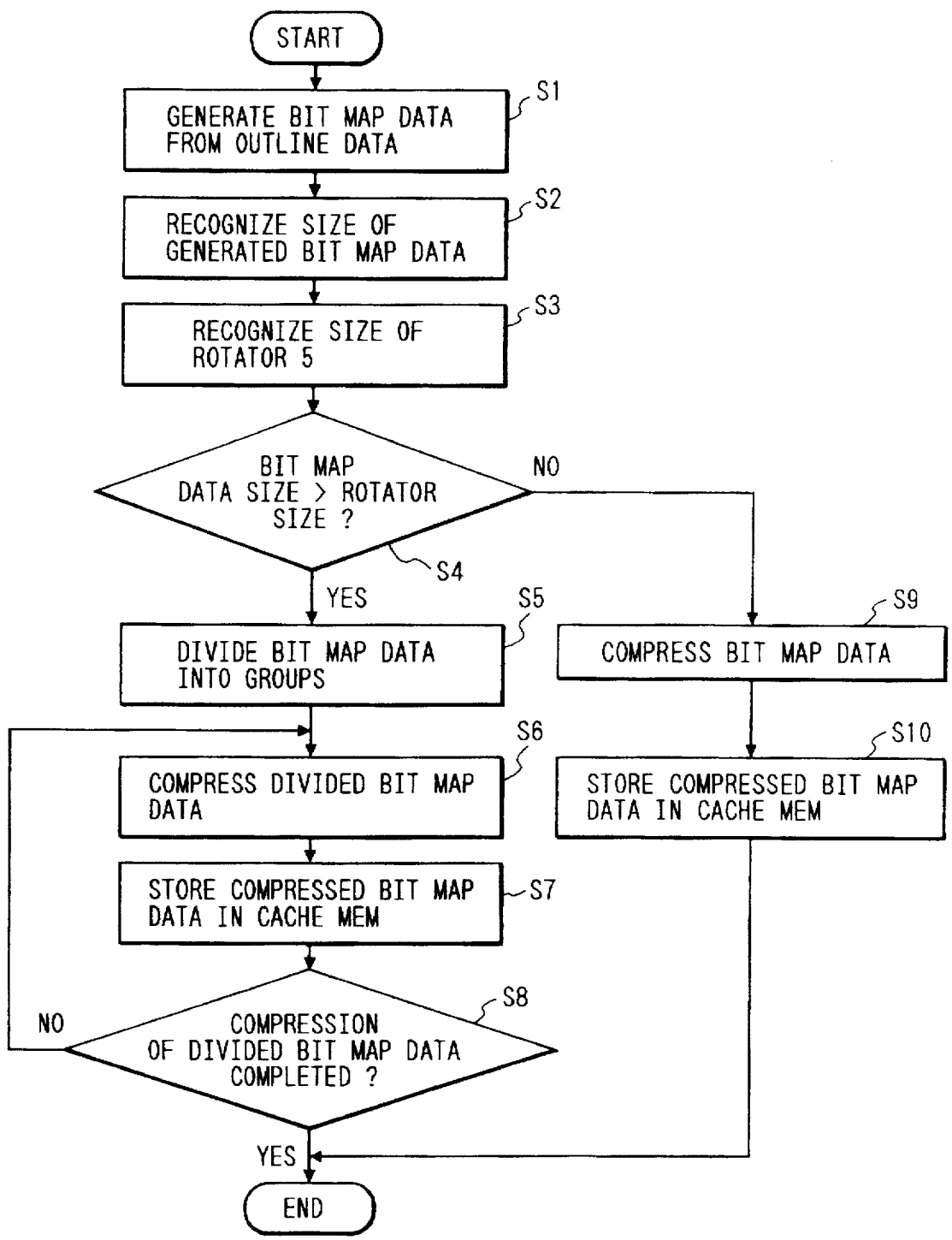
FIG. 4 is a flow chart of a division and compression process in the printer.

In the following there will be explained compression and caching of the bit map data, with reference to FIG. 4.

At first a step S1 generates bit map data in the work memory, from the outline font data of a character to be cached.

Then a step S2 recognizes the size of the generated bit map data and a step S3 recognizes the size of the rotator 5.

A next step S4 discriminates whether the size of the generated bit map data is larger than of the rotator 5.

If the step S4 identifies that the size of the bit map data is larger than that of the rotator 5, a step S5 divides the generated bit map data into a size not exceeding the size of the rotator 5, and a step S6 compresses the divided bit map data by the compressor 2. Then a step S7 caches the compressed bit map data in the cache memory of the RAM 8, then a step S8 discriminates whether the compression of the divided bit map data has been completed, and, if not completed, the sequence proceeds to the step S6 for repeating the compression and caching explained above.

On the other hand, if the step S4 identifies that the size of the bit map data is smaller than that of the rotator 5, the sequence proceeds to a step S9 to compress the bit map data, generated in the step S1, by the compressor 2, and a step S10 caches the compressed bit map data in the cache memory of the RAM 8.

In the following there will be explained, with reference to a flow chart in FIG. 5, the rotation of the cached bit map data and the development thereof in the page memory.

At first a step S11 discriminates whether the bit map data, cached in the cache memory of the RAM 8 corresponding to the character to be developed in the page memory, are divided and compressed. If the step S11 identifies divided and compressed state, a step S12 decompresses the compressed bit map data in the decompressor 3, and a step S13 rotates the decompressed bit map data in the rotator 5.

Then a step S14 develops the rotated bit map data in the page memory of the RAM 8. Then a step S15 discriminates whether the decompression of the divided bit map data has been completed, and, if not, the sequence returns to the step S12 to repeat the decompression, rotation and development. The steps S12 to S15 are controlled by the decompressed data storage controller, but they may instead be controlled by the CPU 6.

On the other hand, if the step S11 identifies that the data are not in the divided state, the sequence proceeds to a step S16 to decompress the compressed bit map data. Then a step S17 rotates the decompressed bit map data by the rotator 5, and a step S18 effects data development in the page memory of the RAM 8.

After the data development of a page in the page memory, the data are released in visible form by the data output unit 9.

As explained in the foregoing, in the rotation of the compressed data in the unit of 90°, the compressed data are written into the decompressor to store the decompressed data in continuous manner into the rotator, and, after the data storage in the rotator, the 90° rotated data are obtained from the rotator, so that the decompression and the rotation can be achieved at a high speed.

[2nd embodiment]

In the foregoing 1st embodiment, the division and the compression of the bit map data are conducted in the printer, but the data divided and compressed in the upper apparatus may be transferred to the printer. Such configuration is realized in a 2nd embodiment, which will be explained with reference to FIGS. 6 and 7.

Figure 6:
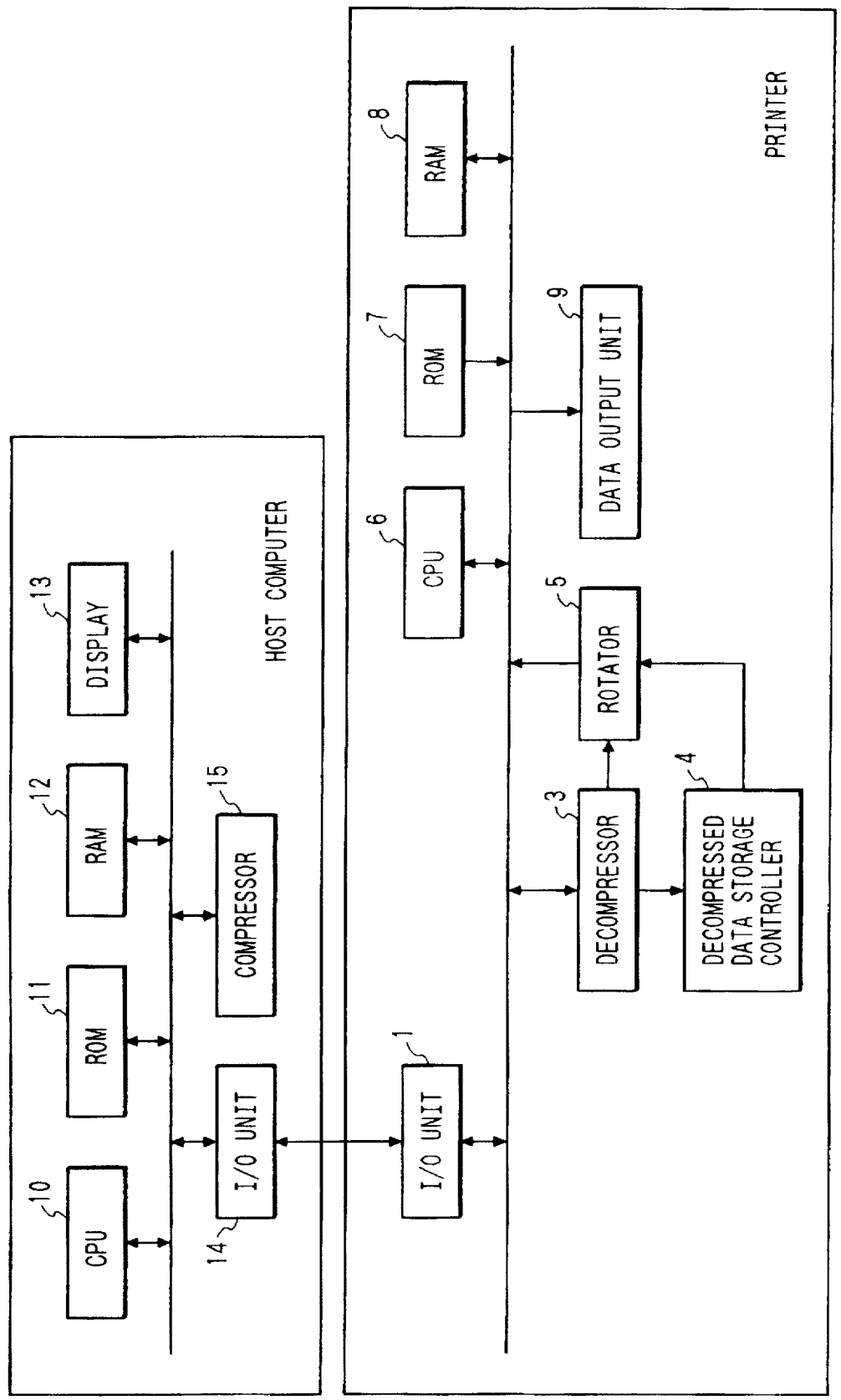
FIG. 6 is a block diagram of another embodiment of the present invention.

FIG. 6 is a block diagram of the 2nd embodiment. The block diagram will not be explained further as it is same as that in FIG. 1, except that the compressor is provided in the upper apparatus.

In the following there will be explained the division, compression and transfer of the bit map data in the upper apparatus, with reference to a flow chart in FIG. 7. A program corresponding to the flow chart in FIG. 7 may be stored in the ROM 11, or in a floppy disk such as a device driver mounted on the host computer, or may be uploaded from the printer to the host computer and stored in the RAM 12.

At first a step S101 generates bit map data in the work memory, from the outline font data of a character to be cached, stored in the ROM 11.

Then a step S102 recognizes the size of the generated bit map data, and a step S103 recognizes the size of the rotator 5. The size of the rotator 5 may be asked to the printer and acquired through a bidirectional interface, or may be stored in advance in the ROM 11 or the RAM 10 of the upper apparatus, corresponding to the printer used.

Then a step S104 discriminates whether the size of the generated bit map data is larger than that of the rotator 5.

If the step S104 identifies that the size of the data is larger than that of the rotator 5, a step S105 divides the generated bit map data into a size not exceeding that of the rotator 5. Then a step S106 compresses the divided bit map data by the compressor 15 of the upper apparatus, and a step S107 transfers the compressed bit map data to the cache memory of the RAM 8 of the printer.

Then a step S108 discriminates whether the compression and the transfer of the divided bit map data have been completed, and, if not, the sequence returns to the step S106 to repeat the compression and the transfer explained above.

On the other hand, if the step S104 identifies that the size of the data does not exceed that of the rotator 5, the sequence proceeds to a step S109 to compress the bit map data, generated in the step S101, by the compressor 15 of the upper apparatus. Then a step S110 transfers the compressed bit map data to the cache memory of the RAM 8 of the printer.

Figure 5:
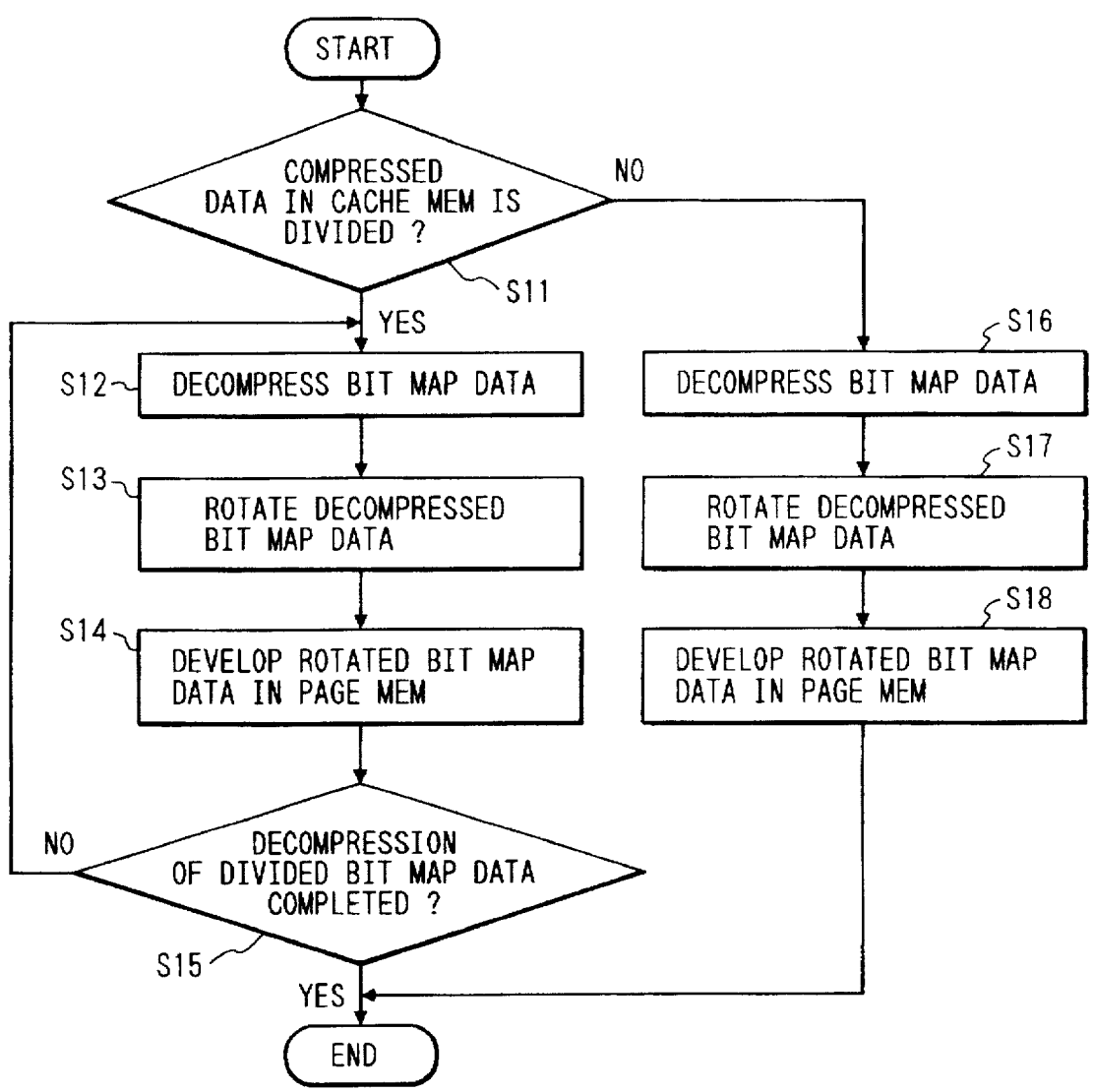
FIG. 5 is a flow chart of a decompression and rotation process in the printer.

The data development process in the printer based on the cached bit map data will not be explained further as it is same as that shown in FIG. 5.

The present 2nd embodiment can reduce the transfer time in comparison with the foregoing embodiment, as the transferred data are in compressed state.

Also the 2nd embodiment has been explained by an example of bit map formatted data converted from outline formatted data, but it is naturally applicable also to the processing of image data.

As explained in the foregoing, the present embodiment allows to obtain 90° rotated decompressed data at a high speed, in the compression of bit map data and the decompression of thus compressed data.

Also the present embodiment enables high-speed data transfer from the upper apparatus to the peripheral device, in a state allowing high-speed data processing by the peripheral device.

[3rd embodiment]

In the following there will be explained, with reference to FIG. 8, a printer constituting a preferred 3rd embodiment of the present invention.

Figure 8:
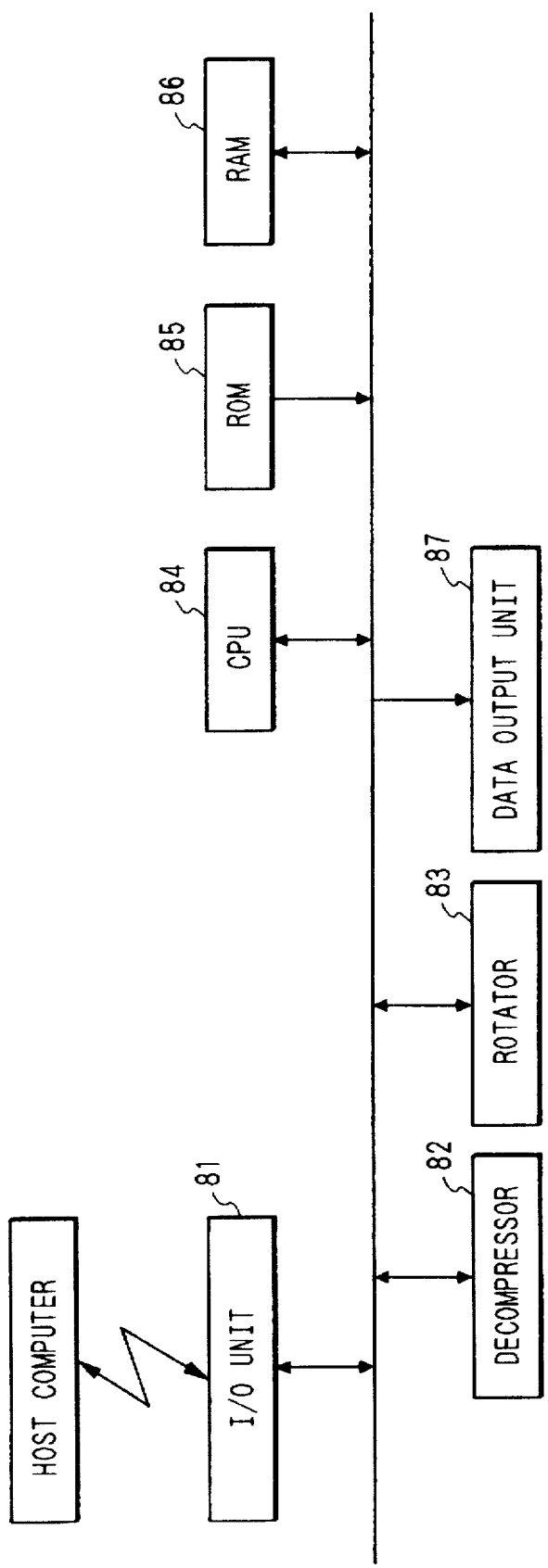
FIG. 8 is a block diagram of a printer constituting an embodiment of the present invention.

In FIG. 8, there are shown an I/O means 81 for data exchange with an upper apparatus such as a host computer, constituting a source of image data such as bit map image data; a data decompressor 82 for decompressing the compressed data received from the upper apparatus; a data rotator 83 for rotating the image data of a size M×N in the unit of 90°; a CPU 84 for controlling the entire printer; a ROM 85 storing control programs to be explained later; a RAM 86 to be used as a work area for the CPU 84 and a memory area for the image data decompressed by the decompressor 2; and a data output unit 87 composed of a printer engine such as of a laser beam printer, for visible display or output of the image data stored in the RAM 86.

At first the host computer requests, to the printer, the size (M×N) of the image to be rotated by the rotator 83. The printer stores this size in advance and transmits it to the host computer by a response, and the host computer recognizes this value.

Figure 9:
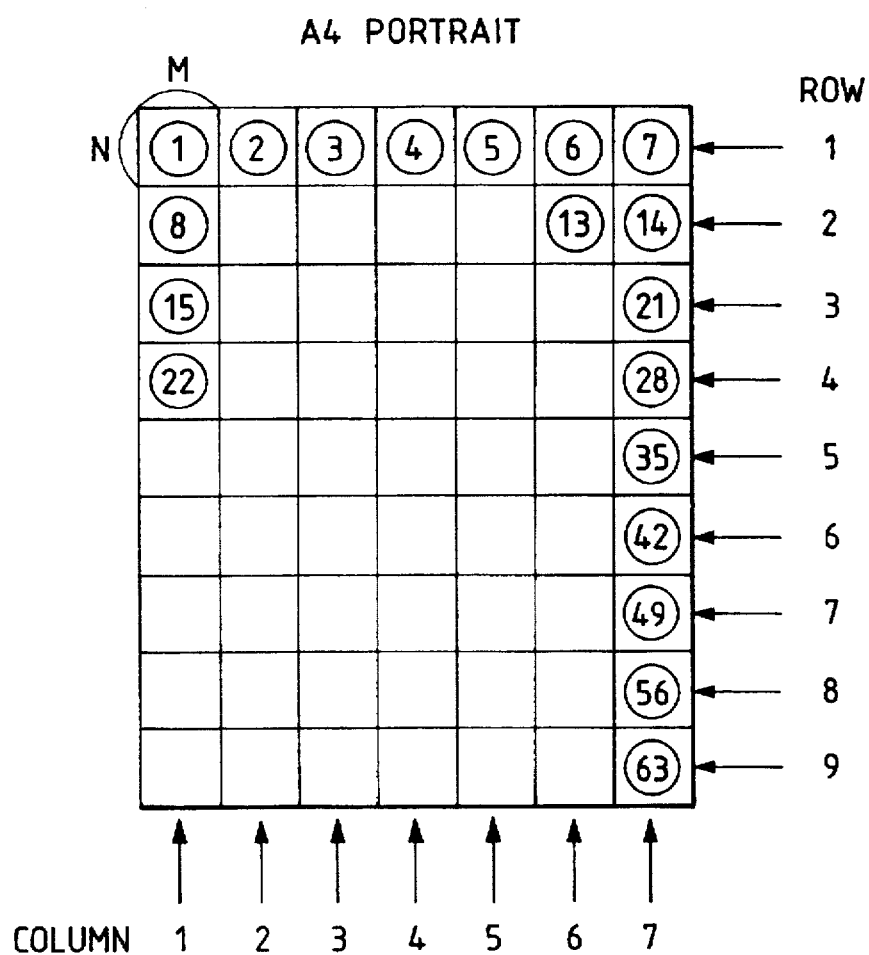
FIG. 9 is a view showing block formation in bit map data.

The host computer divides the vertically oblong A4-sized bit map memory after data development into blocks of a size of M×N, as shown in FIG. 9, and assigns numbers to the divided blocks. The host computer effects compression of the bit map data in each of the divided blocks.

Figure 10A:
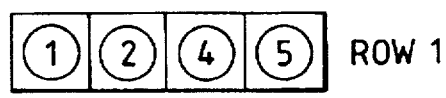
FIGS. 10A and 10B are views showing examples of transferred blocks.
Figure 10B:
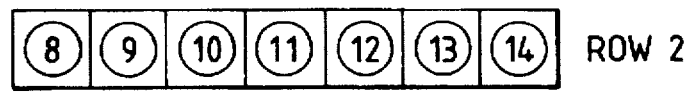

Then, at the transfer of the compressed data to the printer through the I/O unit 81, the host computer transfers each block containing print data, together with the number thereof, but does not transfer any block lacking the print data. FIGS. 10A and 10B illustrate an example of such data transfer. FIG. 10A shows the blocks transferred for the 2nd row, wherein blocks 3, 6 and 7 are not transferred because they are empty. On the other hand, all the blocks are transferred in the 3rd row, since there are no empty blocks.

The printer stores the received blockwise compressed data in the RAM 86 in succession, in combination with the numbers thereof. Upon completion of reception of all the data, the CPU 84 effects rotation and decompression of the data, thereby rotating the original image by 90°, according to a process corresponding to a flow chart shown in FIG. 13. This process is realized by the execution, by the CPU 84, of a program stored in the ROM 85. This process is to rotate the entire image by synthesizing the image consisting of the blocks as the smallest components and the rotation of the image in the unit of each block.

Figure 12:
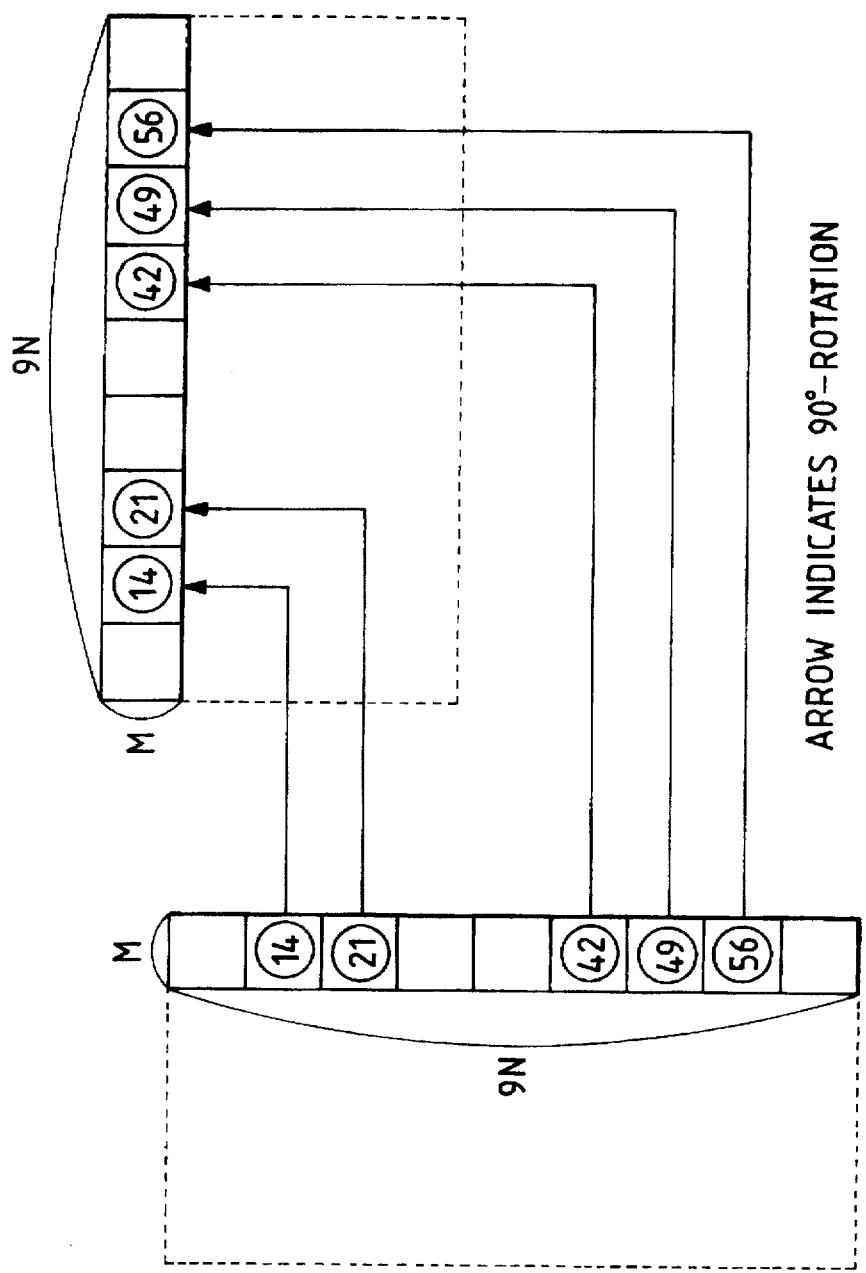
FIG. 12 is a view showing 90° rotation of block arrangement.

In this case, in order to convert the image data of a vertically oblong A4 format into those of a horizontally oblong A4 format, the arrangement of the blocks is rotated by 90°. More specifically, the arrangement of the blocks in the order of numbers shown in FIG. 9 is changed to an arrangement where the righthand side in FIG. 9 is positioned on top, as shown in FIG. 12. This is achieved by a rearrangement of the blocks in the order of 7, 14, 21, . . . , 63, 6, 13, . . . The 90° rotation, or the vertical-horizontal rotation, is achieved by combining the rotation of each block in the same direction.

Figure 13:
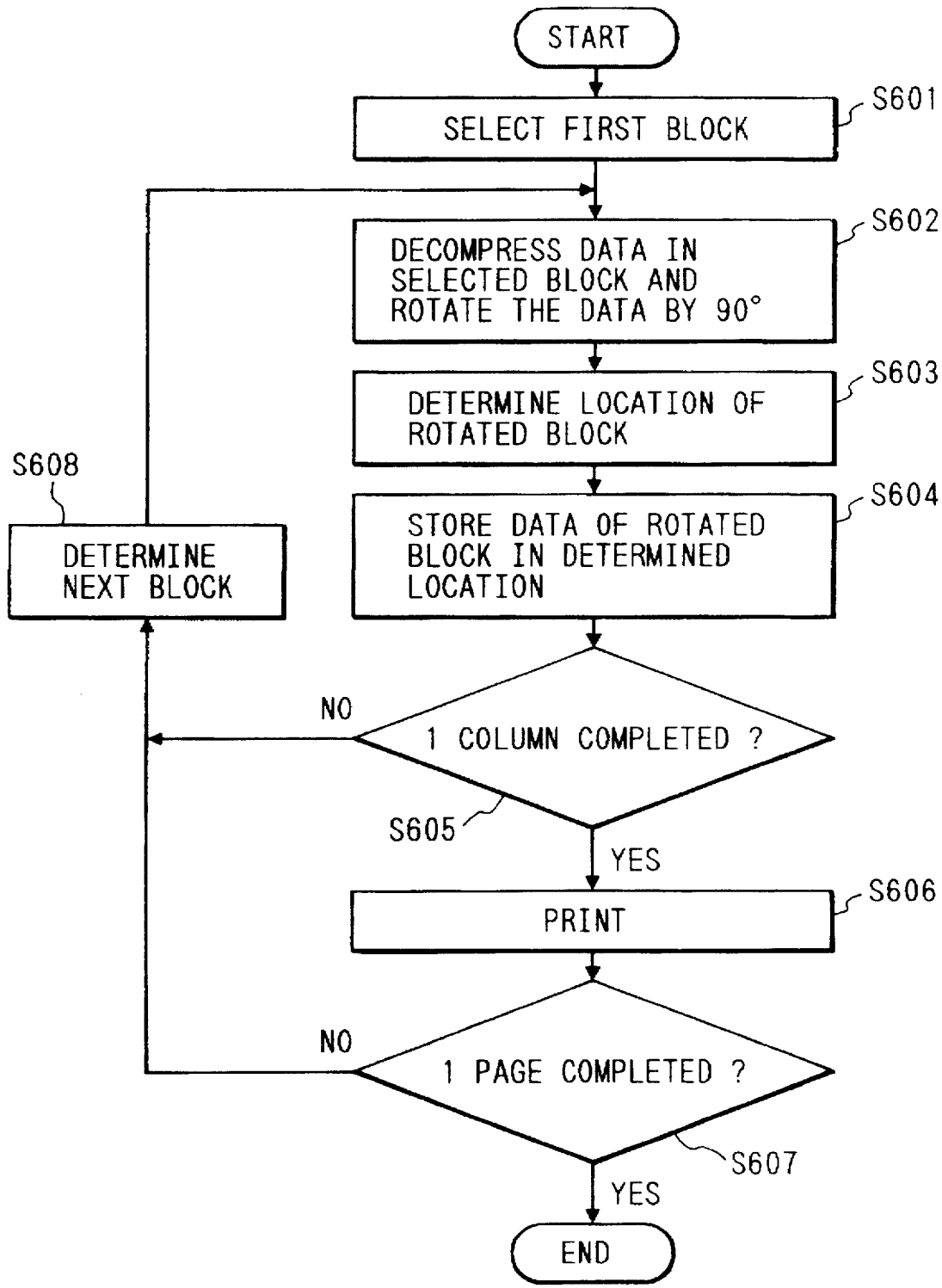
FIG. 13 is a flow chart of an image data rotation process in the printer.

This process will be explained further with reference to FIG. 13.

Figure 11:
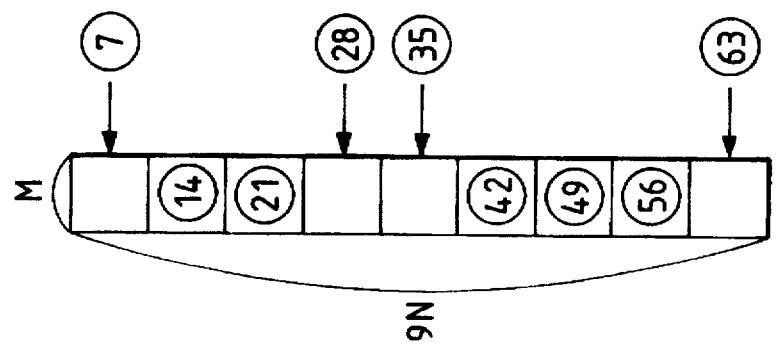
FIG. 11 is a view showing an example of blocks transferred to a data output unit.

At first, there is selected a first block to be subjected to decompression and rotation (step S601), which is the block 7 in the example illustrated in FIG. 9. Then thus selected block (M×N) is decompressed, in the decompressor 82, to the original bit map data, which are rotated by 90° by the rotator 83 (step S602). Then an area in the RAM 86 is determined according to the rotated arrangement of the blocks (S603), and the data in the block are stored in this area (S604). These operations are repeated for all the blocks in a row (steps S605, S608). Upon completion of the decompression and rotation for all the blocks in a row, the CPU 84 transfers the data stored in the RAM 86 to the data output unit 87 and initiates the printing operation (step S606). In the first row, the blocks 7, 28, 35 and 63 are not transferred from the host computer as they do not contain the print data, as shown in FIG. 11, so that the decompression and the rotation are conducted on the received blocks 14, 21, 42, 49 and 56, and a white image of a size of M×N is replenished for each of the unreceived blocks.

The image of a page is printed in this manner.

In the present 3rd embodiment, as explained in the foregoing, the host computer is only required to transmit the blocks containing the data to be printed, so that there can be achieved high-speed data transfer and reduction of the RAM capacity in the printer. Also at the transfer of the bit image data, decompressed from the compressed data, to the data output unit, there can be achieved reduction of the RAM capacity, since the blocks lacking the print data are known in advance.

In the foregoing description, the size M×N of the image to be processed by the rotator 83 is informed to the host computer through the I/O unit 1, but the present invention is not limited to such configuration. Such image size may also be entered by a keyboard or from a floppy disk into the host computer. Also in the foregoing description, the transfer of the compressed data from the host computer is conducted in the unit of each row, but it may naturally be conducted instead in the unit of each column.

[Laser beam printer (LBP)]

Figure 14:
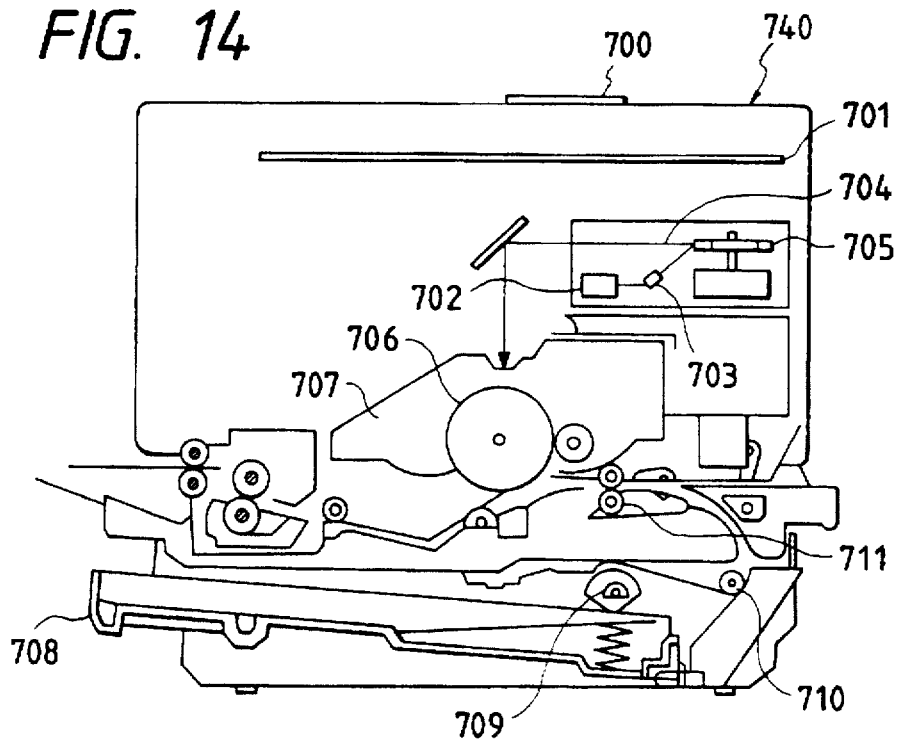
FIG. 14 is a cross-sectional view of a laser beam printer.

FIG. 14 is a cross-sectional view, showing the internal structure of a laser beam printer (LBP), employed as the engine of the foregoing 1st to 3rd embodiments. The laser beam printer is to effect printing on a recording sheet, by receiving character pattern data or the like.

In FIG. 14, there are shown a main body 740 of the LBP, for forming an image on a recording sheet constituting the recording medium, based on the received character pattern; an operation panel 700 provided with operation switches and an LED display device; and a printer control unit 701 for controlling the entire LBP 740 and analyzing character pattern information etc. The printer control unit 701 principally converts the character pattern information into a video signal, for supply to a laser driver 702.

The laser driver 702 for driving a semiconductor laser 703, effects on-off switching of a laser beam 704 emitted from the semiconductor laser 703, according to the input video signal. The laser beam 704, being deflected laterally by a rotary polygon mirror 705, scans an electrostatic drum 706, thereby forming thereon an electrostatic latent image of the character pattern. This latent image is developed, by a developing unit 707 positioned adjacent to the electrostatic drum 706, into a visible image which is transferred onto a recording sheet. The recording sheet, in the form of a cut sheet, is contained in a sheet cassette 708 loaded in the LBP 740 and is supplied into the printer and to the electrostatic drum 706, by means of a sheet feed roller 709 and transport rollers 710, 711.

A laser beam printer has been explained as the image forming device for use in the foregoing embodiments, but the present invention is not limited to such printer and is applicable also to an ink jet printer to be explained in the following.

[Schematic explanation of the printer]

Figure 15:
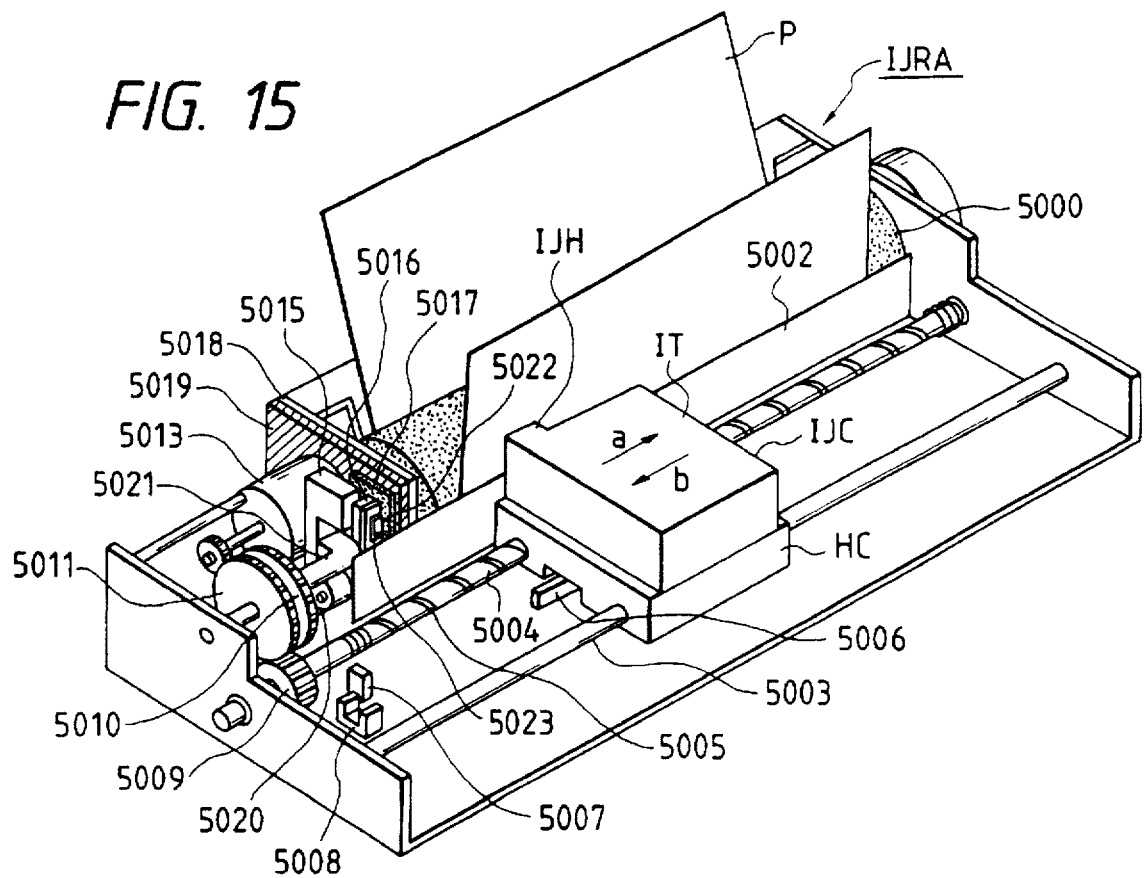
FIG. 15 is a schematic perspective view of an ink jet printer.

FIG. 15 is a schematic view of an ink jet recording apparatus IJRA in which the present invention is applicable. A carriage HC, having a pin (not shown), engages with a spiral groove 5004 of a lead screw 5005 rotated by the forward or reverse rotation of a driving motor 5013 through transmission gears 5011, 5009, and is thus reciprocated in directions a and b. An ink jet cartridge IJC is mounted on the carriage HC. A sheet pressing plate 5002 presses the recording sheet to a platen 5000, along the moving direction of the carriage. A photocoupler 5007, 5008 constitutes home position detection means for detecting a lever 5006 of the carriage in a region of the photocoupler, thereby switching the rotating direction of the motor 5013. A member 5016 supports a cap member 5022 for capping the front face of the recording head, while suction means 5015 for sucking the interior of the cap member 5022 effects recovery of the recording head by suction. A cleaning blade 5017 and a member 5019 for retractably supporting the cleaning blade are supported by a support plate 5018 of the main body. The cleaning blade is not limited to the illustrated shape but can be composed of the blade of any known shape. A lever 5021 for initiating the suction recovery operation is moved by cam 5020 engaging with the carriage, and the driving force of the driving motor is transmitted by known transmission means such as a clutch.

As explained in the foregoing, the data output unit 7 can utilize various methods such as the laser beam recording method and the ink jet recording method.

The present invention is applicable to a system composed of plural equipment or an apparatus composed of a single equipment. Also the present invention is naturally applicable also to a case in which the present invention is achieved by the supply of a program to a system or an apparatus.

As explained in the foregoing, the output device or the control method therefor constituting the 3rd embodiment can achieve a higher speed in the process, since the upper apparatus is not required to recognize the difference between the direction of the image data in the upper apparatus and the transporting direction in the output device but is merely required to compress the image data and to transfer thus compressed image data to the output device.

Also a reduction in the memory capacity can be achieved because the data transfer is made only in the blocks containing the output data, and a higher speed in the process can be achieved because the decompression is made only in the blocks containing the output data.

[4th embodiment]

Figure 16:
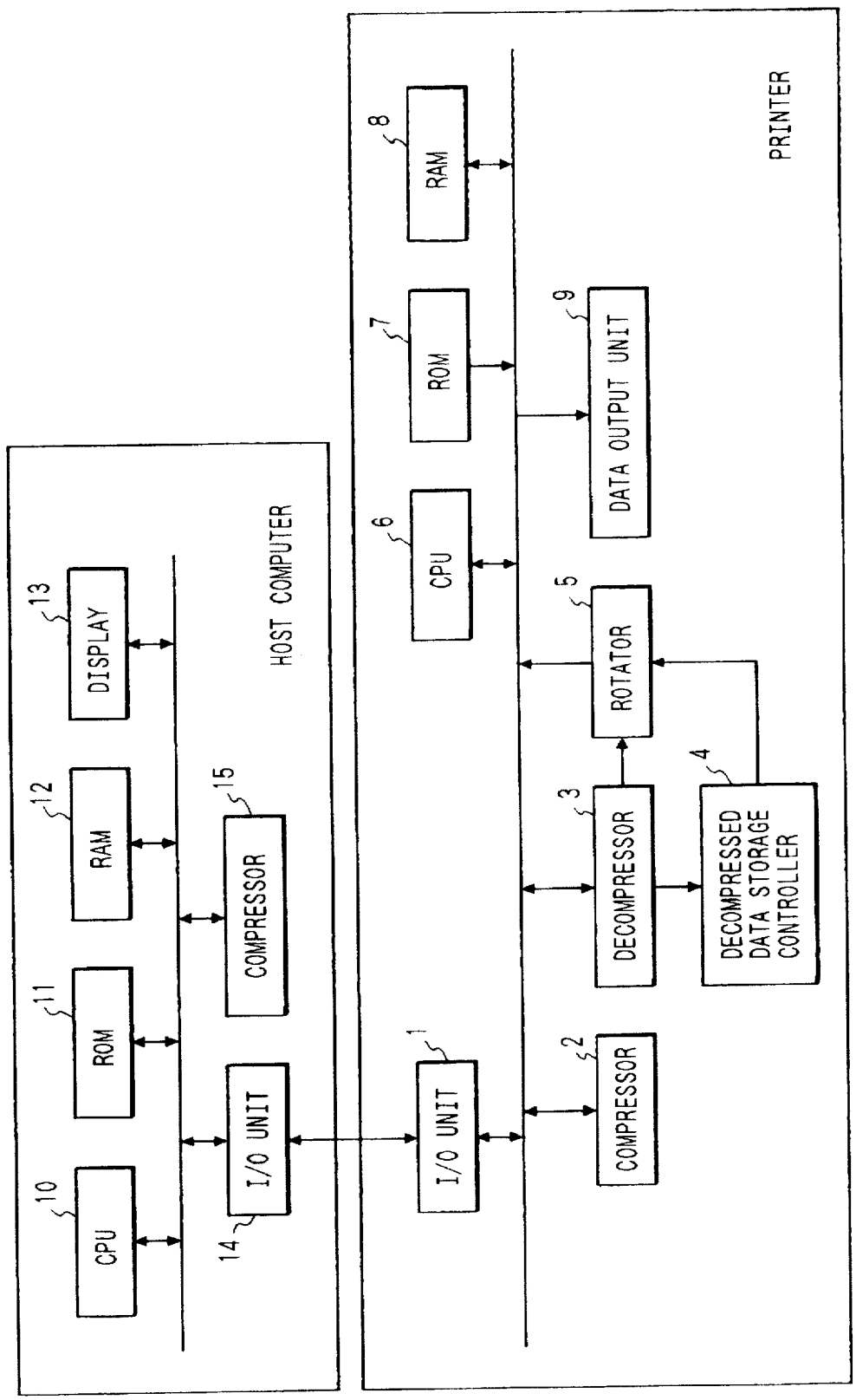
FIG. 16 is a block diagram showing a 4th embodiment of the present invention.

In FIG. 16, there are shown an I/O unit 1 for data exchange with an upper apparatus such as a host computer; a compressor 2 for converting characters etc. represented by an outline format into bit map data in a bit map format and compressing thus converted bit map data; and a decompressor 3, composed of a hardware such as a gate array, for decompressing the bit map data transferred from the upper apparatus such as the host computer or compressed by the compressor 2.

5 indicates a rotator (hardware) for rotating matrix data of 128×128 dot size in the unit of 90°. The data decompressed in the decompressor 3 are written continuously, by a decompressed data storage controller 4, into the hardware rotator 5.

6 indicates a CPU controlling the entire printer.

Figure 19:
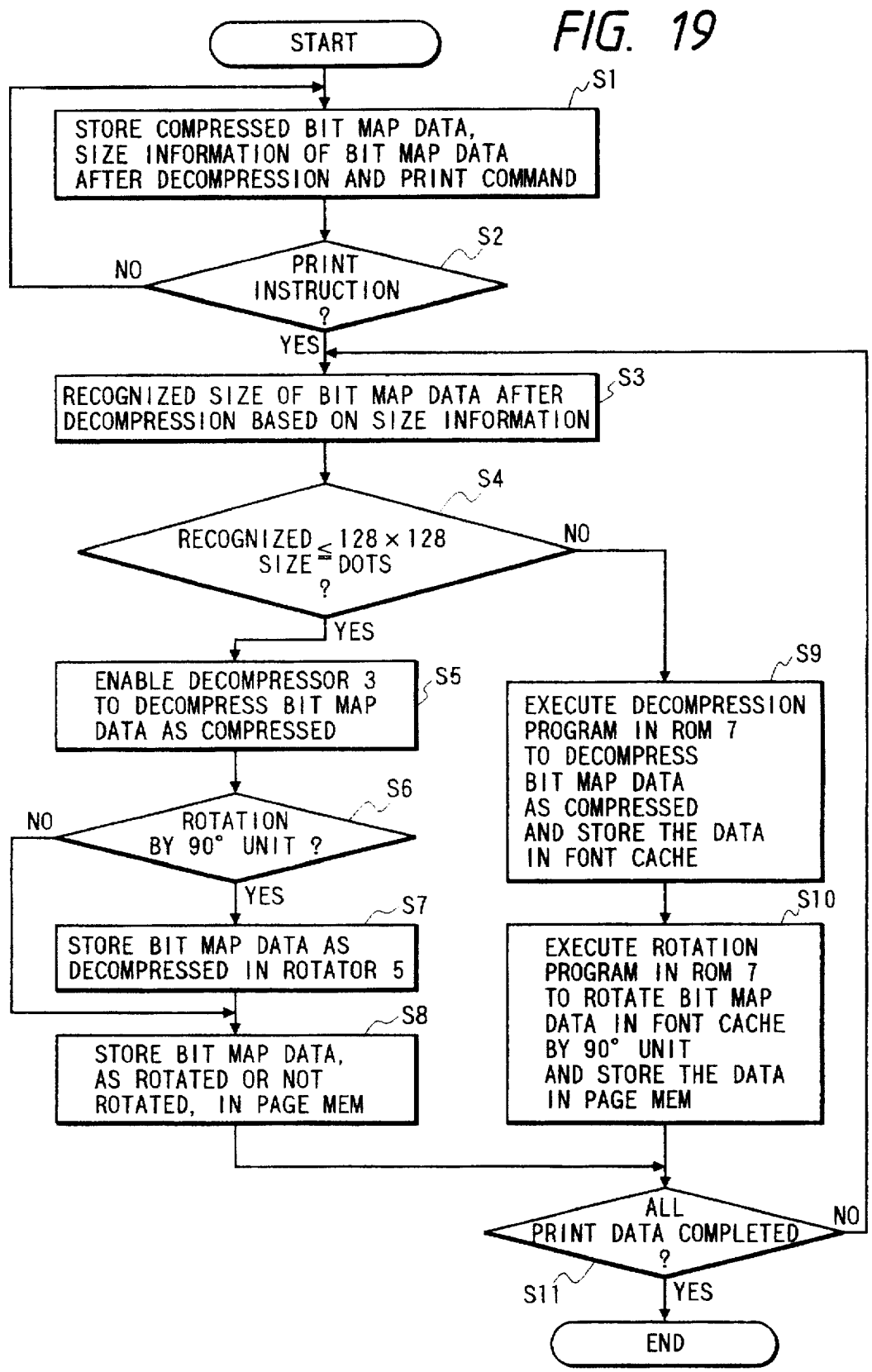
FIG. 19 is a flow chart showing a data processing program to be executed in the printer of the 4th embodiment.
Figure 20:
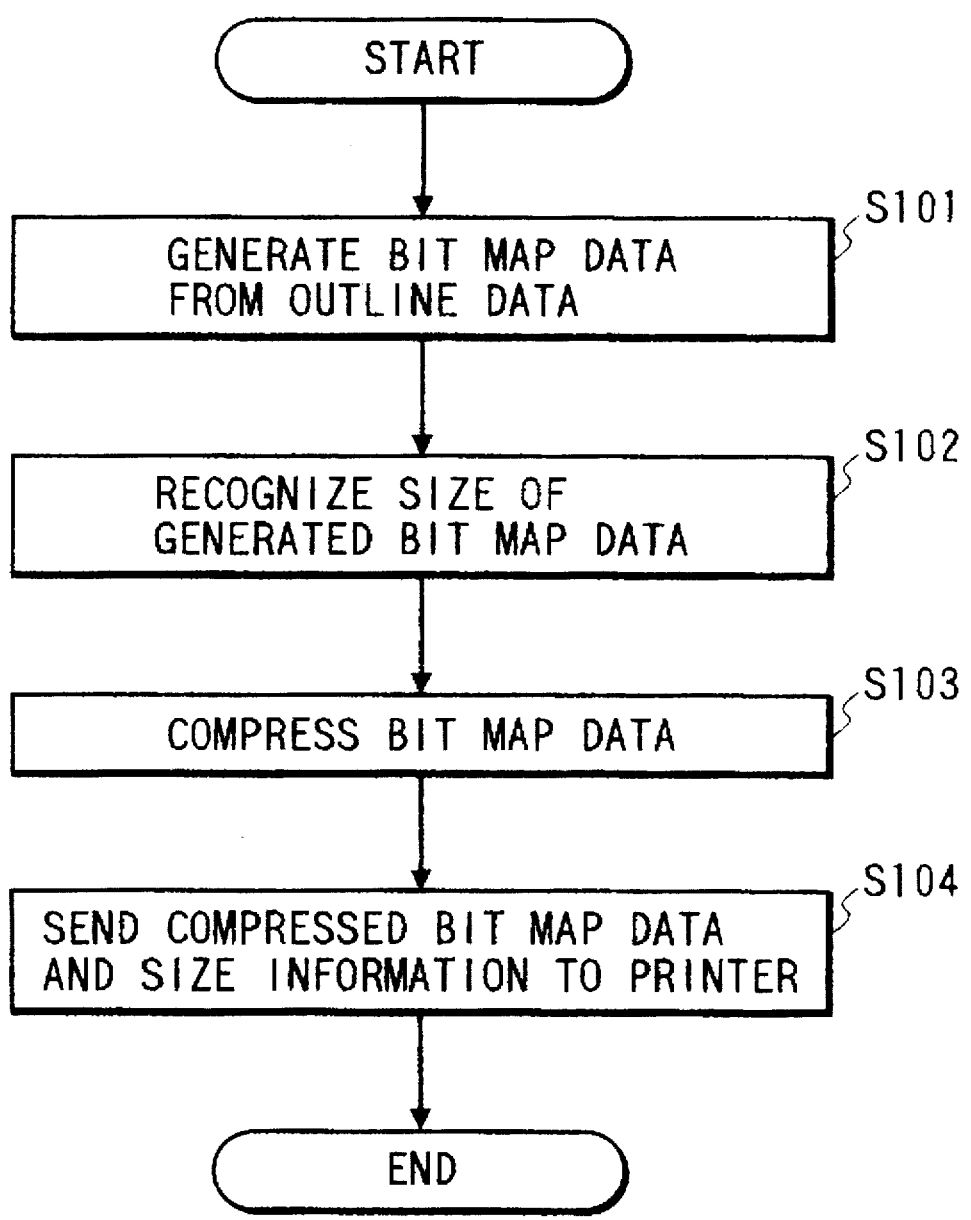
FIG. 20 is a flow chart showing a data processing program to be executed in the upper apparatus of the 4th embodiment.

7 indicates a ROM storing for example data processing programs shown in FIGS. 19 and 20, a known decompression program, a known rotation program, outline font data etc.

8 indicates a RAM containing therein a buffer memory for storing print commands and print data entered from the upper apparatus, a work memory for the CPU 4, a page memory for storing bit map data developed for printing, a cache memory for storing bit map data generated from the outline data etc. Also 9 indicates a data output unit for visible display/output of the bit image data stored in the RAM 8 and is composed of a printer engine for example of a laser beam printer.

10 indicates a CPU for controlling the entire upper apparatus. 11 indicates a ROM for storing a data processing program corresponding to the flow chart in FIG. 20 and outline font data. 12 is a RAM containing for example a work memory for the CPU 10. 13 is a display unit, such as a CRT display, for displaying various data. 14 is an I/O unit for data exchange with the printer.

15 indicates a compressor for compressing the data converted from outline data into bit map image.

In the following there will be briefly explained the functions of the printer of the present embodiment.

Print commands and print data are transferred from the upper apparatus through the I/O unit 1 and are stored in the buffer memory of the RAM 8. The CPU 6 analyzes the stored print commands and print data, and, upon finding a print instruction, prepares bit image data in the page memory of the RAM 8 and sends the prepared bit image data to the output unit 9.

The compressed data are decompressed and stored in the page memory of the RAM 8, as will be explained in more details in the following with reference to FIGS. 17, 18 and 19.

Figure 17:
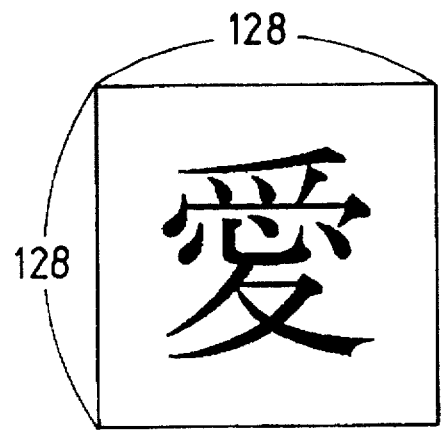
FIG. 17 is a view showing bit map data of 128×128 dot size in the 4th embodiment.
Figure 18:
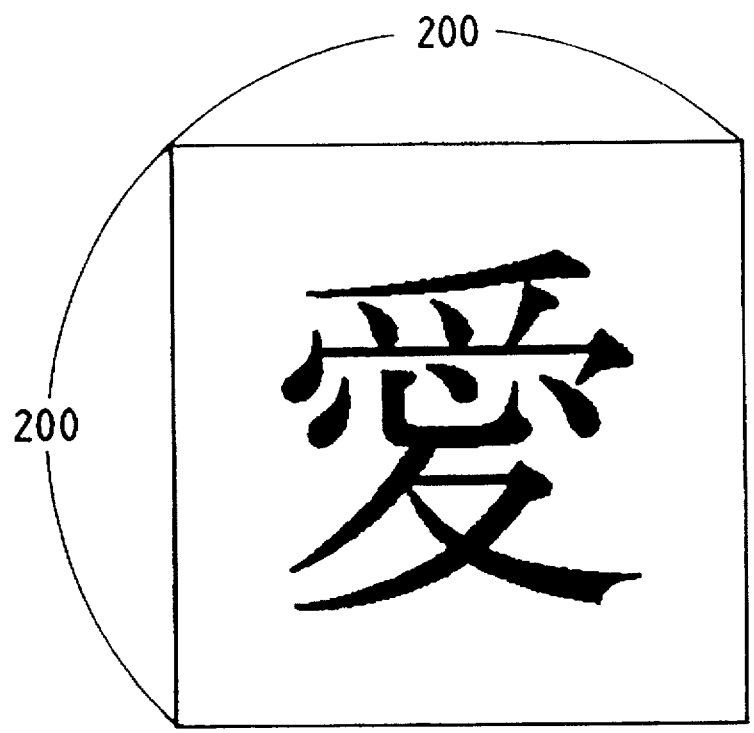
FIG. 18 is a view showing bit map data of 200×200 dot size in the 4th embodiment.

FIG. 17 shows a character with a width of 128 dots and a height of 128 dots, while FIG. 18 shows a character with a width of 200 dots and a height of 200 dots.

Now reference is made to a data processing program in a flow chart in FIG. 19, for explaining a decompression process for decompressing the compressed bit map data.

At first in a step S1, the CPU 6 stores the compressed bit map data, size information indicating the size of the bit map data after decompression and print command, received from the upper apparatus, in the RAM 8.

Then, in a step S2, the CPU discriminates whether a print instruction is entered by analyzing the print command, and, if not, the sequence returns to the step S1, but, if entered, it recognizes, in a step S3, the size of the bit map data after decompression based on the size information of the character to be printed.

Then, in a step S4, the CPU 6 discriminates whether the size recognized in the step S3 does not exceed the size of 128×128 dots, decompressable in the decompressor 3.

If the step S4 identifies that the recognized size does not exceed the size of 128×128 dots, the CPU 6 causes, in a step S5, the decompressor 3 (gate array) to decompress the compressed bit map data.

Then, in a step S6, the CPU 6 discriminates, based on the entered print command, whether a rotation in the unit of 90° is instructed, and, if instructed, causes the decompressed data storage controller 4, in a step S7, to store the decompressed data in a rotator 5 (hardware).

Then, in a step S8, the CPU 6 stores the bit map data, unrotated or rotated in the unit of 90°, in the page memory of the RAM 8.

On the other hand, if the step S4 identifies that the recognized size exceeds the size of 128×128 dots, the CPU 6 decompresses, in a step S9, the compressed bit map data by executing a known decompression program stored in the ROM 7, and stores the decompressed data as font cache in the RAM 8.

Also in case the CPU 6 identifies the presence of an instruction for rotation by the unit of 90° based on the entered print command, it rotates, in a step S10, the bit map data stored as font cache by 90° by executing a known rotation program stored in the ROM 7 and stores the rotated data in the page memory of the RAM 8.

Then the CPU 6 discriminates, in a step S11, whether all the print data have been processed, and, if processed, sends the bit image data, stored in the page memory of the RAM 8, to the data output unit 9 for executing, for example, a printing operation.

In the following there will be explained a process of compression and transfer of the bit map data in the upper apparatus such as a host computer, by a data processing program corresponding to a flow chart in FIG. 20.

At first, in a step S101, the CPU 10 generates bit map data based on the instructed outline data.

Then, in a step S102, the CPU 10 generates size information by recognizing the width and the height of the generated bit map data, and stores the bit map data and the size information in the work memory of the RAM 12.

Then the CPU 10 causes the compressor 15, in a step S103, to compress the bit map data stored in the RAM 12, and transfers, in a step S104, the compressed bit map data and size information to the printer through the interface.

The present embodiment has been explained by the case of characters as an example of bit map data, but it is also applicable to the processing of image data, and, in such case, the data are not stored as the font cache in the RAM 8.

In this embodiment, the laser beam printer as shown in FIG. 14 may be employed as the printer engine.

Also in the foregoing description of the present embodiment, the printer engine is assumed to be composed of a laser beam printer, but the ink jet recording apparatus IJRA as shown in FIG. 15 is also applicable.

As explained in the foregoing, the present embodiment allows to select whether the compressed data are to be decompressed by a decompression circuit or by a decompression program, according to the data size after the decompression of the compressed data.

Also the present embodiment can achieve high-speed decompression eventually combined with rotation in the unit of 90°, also with economization of the memory capacity, by caching the compressed data for the characters of a frequently used size.

Furthermore, the present embodiment can achieve high-speed decompression with a decompression program, for the data exceeding a predetermined size, requiring excessive time for decompression by the decompression circuit.

What is claimed is:

1. A data processing apparatus comprising:

recognition means for recognizing the size of data of a bit map format to be compressed and the size rotatable by rotation means;

division means for dividing the bit map-formatted data to be compressed, based on the size of the bit map-formatted data and the size rotatable by the rotation means recognized by said recognition means;

compression means for compressing the bit map-formatted data divided by said division means; and transfer means for transferring the bit map-formatted data, compressed by said compression means, to an output device.

2. A data processing apparatus according to claim 1, further comprising:

generation means for generating data of a bit map format from data of a vector format;

wherein said recognition means is adapted to recognize the size of the bit map-formatted data generated by said generation means.

3. A data processing apparatus according to claim 1, wherein said division means is adapted, in case the size of the bit map-formatted data, recognized by said recognition means is larger than the size rotatable by the rotation means as recognized by said recognition means, to divide the bit map-formatted data to be compressed into a size equal to or smaller than the size rotatable by the rotation means as recognized by said recognition means.

4. A data processing apparatus according to claim 1, wherein said division means is adapted, in case the size of the bit map-formatted data, recognized by said recognition means is smaller than the size rotatable by the rotation means as recognized by said recognition means, not to divide the bit map-formatted data to be compressed, and said compression means is adapted to compress the bit map-formatted data to be compressed, without division.

5. A data processing apparatus according to claim 1, wherein said output device is a printer.

6. An output device comprising:
memory means for storing compressed data in a bit map format;
discrimination means for discriminating whether the bit map-formatted compressed data are stored in divided manner;
decompression means adapted, in case said discrimination means identifies divided data storage, to decompress the divided and compressed bit map-formatted data;
rotation means for rotating the bit map-formatted data decompressed by said decompression means;
output means for output of the bit map-formatted data rotated by said rotation means;
recognition means for recognizing the size of data of a bit map format to be compressed and the size rotatable by said rotation means;
division means for dividing the bit map-formatted data to be compressed, based on the size of the bit map-formatted data and the size rotatable by the rotation means recognized by said recognition means; and
compression means for compressing the bit map-formatted data divided by said division means.

7. An output device according to claim 6, further comprising:
generation means for generating data of a bit map format from data of a vector format;
wherein said recognition means is adapted to recognize the size of the bit map-formatted data generated by said generation means.

8. An output device according to claim 6, wherein said division means is adapted, in case the size of the bit map-formatted data, recognized by said recognition means is larger than the size rotatable by the rotation means as recognized by said recognition means, to divide the bit map-formatted data to be compressed into a size equal to or smaller than the size rotatable by the rotation means as recognized by said recognition means.

9. An output device according to claim 8, wherein said division means is adapted, in case the size of the bit map-formatted data, recognized by said recognition means is smaller than the size rotatable by the rotation means as recognized by said recognition means, not to divide the bit map-formatted data to be compressed, and said compression means is adapted to compress the bit map-formatted data to be compressed, without division.

10. A data processing method comprising:
a recognition step for recognizing the size of data of a bit map format to be compressed and the size rotatable by rotation means;
a division step for dividing the bit map-formatted data to be compressed, based on the size of the bit map-formatted data and the size rotatable by the rotation means recognized by said recognition step;
a compression step for compressing the bit map-formatted data divided by said division step; and
a transfer step for transferring the bit map-formatted data, compressed by said compression step, to an output device.

11. A data processing method according to claim 10, further comprising:
a generation step for generating data of a bit map format from data of a vector format;
wherein said recognition step is adapted to recognize the size of the bit map-formatted data generated by said generation step.

12. A data processing method according to claim 10, wherein said division step is adapted, in case the size of the bit map-formatted data, recognized by said recognition step is larger than the size rotatable by the rotation means as recognized by said recognition step, to divide the bit map-formatted data to be compressed into a size equal to or smaller than the size rotatable by the rotation means as recognized by said recognition step.

13. A data processing method according to claim 12, wherein said division step is adapted, in case the size of the bit map-formatted data, recognized by said recognition step is smaller than the size rotatable by the rotation means as recognized by said recognition step, not to divide the bit map-formatted data to be compressed, and said compression step is adapted to compress the bit map-formatted data to be compressed, without division.

14. A data processing method according to claim 10, wherein said output device is a printer.

15. An output control method comprising:
a memory step for storing compressed data in a bit map format, in memory means;
a discrimination step for discriminating whether the bit map-formatted compressed data are stored in divided manner;
a decompression step adapted, in case said discrimination step identifies divided data storage, to decompress the divided and compressed bit map-formatted data;
a rotation step for rotating, by a rotator, the bit map-formatted data decompressed by said decompression step;
an output step for output, by output means, of the bit map-formatted data rotated by said rotation step;
a recognition step for recognizing the size of data of a bit map format to be compressed and the size rotatable by the rotator;
a division step for dividing the bit map-formatted data to be compressed, based on the size of the bit map-formatted data and the size rotatable by the rotator recognized by said recognition step; and
a compression step for compressing the bit map-formatted data divided by said division step.

16. An output control method according to claim 15, further comprising:
a generation step for generating date of a bit map format from data of a vector format;

wherein said recognition step is adapted to recognize the size of the bit map-formatted data generated by said generation step.

17. An output control method according to claim 15, wherein said division step is adapted, in case the size of the bit map-formatted data, recognized by said recognition step is larger than the size rotatable by the rotation means as recognized by said recognition step, to divide the bit map-formatted data to be compressed into a size equal to or smaller than the size rotatable by the rotation means as recognized by said recognition step.

18. An output control method according to claim 17, wherein said division step is adapted, in case the size of the bit map-formatted data, recognized by said recognition step is smaller than the size rotatable by the rotation means as recognized by said recognition step, not to divide the bit map-formatted data to be compressed, and said compression step is adapted to compress the bit map-formatted data to be compressed, without division.

19. A memory medium storing a data processing program comprising:
- a recognition step for recognizing the size of data of a bit map format to be compressed and the size rotatable by rotation means;
- a division step for dividing the bit map-formatted data to be compressed, based on the size of the bit map-formatted data and the size rotatable by the rotation means recognized by said recognition step; and
- a compression step for compressing the bit map-formatted data divided by said division step.

20. A memory medium storing a data processing program according to claim 19, further comprising:
- a generation step for generating data of a bit map format from data of a vector format;
- wherein said recognition step is adapted to recognize the size of the bit map-formatted data generated by said generation step.

21. A memory medium storing a data processing program according to claim 19, wherein said division step is adapted, in case the size of the bit map-formatted data, recognized by said recognition step is larger than the size rotatable by the rotation means as recognized by said recognition step, to divide the bit map-formatted data to be compressed into a size equal to or smaller than the size rotatable by the rotation means as recognized by said recognition step.

22. A memory medium storing a data processing program according to claim 19, wherein said division step is adapted, in case the size of the bit map-formatted data, recognized by said recognition step is smaller than the size rotatable by the rotation means as recognized by said recognition step, not to divide the bit map-formatted data to be compressed, and said compression step is adapted to compress the bit map-formatted data to be compressed, without division.

23. A memory medium storing a control program for use in a computer, said control program comprising:
- a memory step for storing compressed data in a bit map format, in memory means;
- a discrimination step for discriminating whether the bit map-formatted compressed data are stored in divided manner;
- a decompression step adapted, in case said discrimination step identifies divided data storage, to decompress the divided and compressed bit map-formatted data;
- a rotation step for rotating, by a rotator, the bit map-formatted data decompressed by said decompression step;
- a recognition step for recognizing the size of data of a bit map format to be compressed and the size rotatable by the rotator;
- a division step for dividing the bit map-formatted data to be compressed, based on the size of the bit map-formatted data and the size rotatable by the rotator recognized by said recognition step; and
- a compression step for compressing the bit map-formatted data divided by said division step.

24. A memory medium storing a control program for use in a computer, according to claim 23, wherein said control program further comprises:
- a generation step for generating data of a bit map format from data of a vector format;
- wherein said recognition step is adapted to recognize the size of the bit map-formatted data generated by said generation step.

25. A memory medium storing a control program for use in a computer, according to claim 23, wherein said division step is adapted, in case the size of the bit map-formatted data, recognized by said recognition step is larger than the size rotatable by the rotation means as recognized by said recognition step, to divide the bit map-formatted data to be compressed into a size equal to or smaller than the size rotatable by the rotation means as recognized by said recognition step.

26. A memory medium storing a control program for use in a computer, according to claim 25, wherein said division step is adapted, in case the size of the bit map-formatted data, recognized by said recognition step is smaller than the size rotatable by the rotation means as recognized by said recognition step, not to divide the bit map-formatted data to be compressed, and said compression step is adapted to compress the bit map-formatted data to be compressed, without division.

27. A data processing apparatus comprising:
- recognition means for recognizing the size of data of a bit map format to be compressed and the size rotatable by rotation means;
- compression means for compressing said bit map-formatted data based on the size of the bit map-formatted data and the size rotatable by the rotation means recognized by said recognition means; and
- transfer means for transferring the bit map-formatted data, compressed by said compression means, to an output device.

28. A data processing apparatus according to claim 27, further comprising:
- generation means for generating data of a bit map format from data of a vector format;
- wherein said recognition means is adapted to recognize the size of the bit map-formatted data generated by said generation means.

29. A data processing apparatus according to claim 27, wherein said compression means is adapted to compress the bit map-formatted data of a size not exceeding the size rotatable by the rotation means.

30. A data processing apparatus according to claim 27, wherein said output device is a printer.

31. An output device comprising:
- memory means for storing compressed data in a bit map format;
- discrimination means for discriminating whether the bit map-formatted compressed data are stored;
- rotation means adapted, in case said discrimination means identifies a data stored state, to decompress the compressed bit map-formatted data and to rotate said decompressed bit map-formatted data;

output means for output of the bit map-formatted data rotated by said rotation means;

recognition means for recognizing the size of data of a bit map format to be compressed and the size rotatable by said rotation means; and compression means for compressing said bit map-formatted data, based on the size of the bit map-formatted data and the size rotatable by the rotation means recognized by said recognition means.

32. An output device according to claim 31, further comprising:

generation means for generating data of a bit map format from data of a vector format;

wherein said recognition means is adapted to recognize the size of the bit map-formatted data generated by said generation means.

33. An output device according to claim 31, wherein said compression means is adapted to compress the bit map-formatted data of a size not exceeding the size rotatable by the rotation means as recognized by said recognition means.

34. A data processing method comprising:

a recognition step for recognizing the size of data of a bit map format to be compressed and the size rotatable by a rotator;

a compression step for compressing said bit map-formatted data, based on the size of the bit map-formatted data and the size rotatable by the rotator recognized by said recognition step; and a transfer step for transferring the bit map-formatted data, compressed by said compression step, to an output device.

35. A data processing method according to claim 34, further comprising:

a generation step for generating data of a bit map format from data of a vector format;

wherein said recognition step is adapted to recognize the size of the bit map-formatted data generated by said generation step.

36. A data processing method according to claim 34, wherein said compression step is adapted to compress the bit map-formatted data of a size not exceeding the size rotatable by the rotator as recognized by said recognition step.

37. A data processing method according to claim 34, wherein said output device is a printer.

38. An output control method comprising:

a memory step for storing compressed data in a bit map format, in memory means;

a discrimination step for discriminating whether the bit map-formatted compressed data are stored;

a rotation step adapted, in case said discrimination step identifies data stored state, to decompress the compressed bit map-formatted data and to rotate, by a rotator, said decompressed bit map-formatted data;

an output step for output, by output means, of the bit map-formatted data rotated by said rotation step;

a recognition step for recognizing the size of data of a bit map format to be compressed and the size rotatable by the rotator; and a compression step for compressing said bit map-formatted data, based on the size of the bit map-formatted data and the size rotatable by the rotator recognized by said recognition step.

39. An output control method according to claim 38, further comprising:

a generation step for generating data of a bit map format from data of a vector format;

wherein said recognition step is adapted to recognize the size of the bit map-formatted data generated by said generation step.

40. An output control method according to claim 38, wherein said compression step is adapted to compress the bit map-formatted data of a size not exceeding the size rotatable by the rotator, as recognized by said recognition step.

41. A memory medium storing a data processing program for use in a computer, said data processing program comprising:

a recognition step for recognizing the size of data of a bit map format to be compressed and the size rotatable by a rotator; and a compression step for compressing said bit map-formatted data, based on the size of the bit map-formatted data and the size rotatable by the rotator recognized by said recognition step.

42. A memory medium storing a data processing program for use in a computer, according to claim 41, further comprising:

a generation step for generating data of a bit map format from data of a vector format;

wherein said recognition step is adapted to recognize the size of the bit map-formatted data generated by said generation step.

43. A memory medium storing a data processing program for use in a computer, according to claim 41, wherein said compression step is adapted to compress the bit map-formatted data of a size not exceeding the size rotatable by the rotator as recognized by said recognition step.

44. A memory medium storing a control program for use in a computer, comprising:

a memory step for storing compressed data in a bit map format, in memory means;

a discrimination step for discriminating whether the bit map-formatted compressed data are stored;

a rotation step adapted, in case said discrimination step identifies data stored state, to decompress the compressed bit map-formatted data and to rotate, by a rotator, said decompressed bit map-formatted data;

a recognition step for recognizing the size of data of a bit map format to be compressed and the size rotatable by the rotator; and a compression step for compressing said bit map-formatted data, based on the size of the bit map-formatted data and the size rotatable by the rotator recognized by said recognition step.

45. A memory medium storing a control program for use in a computer according to claim 44, further comprising:

a generation step for generating data of a bit map format from data of a vector format;

wherein said recognition step is adapted to recognize the size of the bit map-formatted data generated by said generation step.

46. A memory medium storing a control program for use in a computer according to claim 44, wherein said compression step is adapted to compress the bit map-formatted data of a size not exceeding the size rotatable by the rotator, as recognized by said recognition step.

* * * * *